(12) United States Patent
Lagnado et al.

(10) Patent No.: US 8,655,355 B2
(45) Date of Patent: Feb. 18, 2014

(54) WIRELESS DEVICE THAT RECEIVES DATA AND SCANS FOR ANOTHER ACCESS POINT

(75) Inventors: Isaac Lagnado, Houston, TX (US); Timothy Neill, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2032 days.

(21) Appl. No.: 11/345,889

(22) Filed: Feb. 2, 2006

(65) Prior Publication Data

US 2007/0178897 A1   Aug. 2, 2007

(51) Int. Cl.
*H04W 4/00* (2009.01)

(52) U.S. Cl.
USPC ......... 455/434; 455/41.2; 455/41.3; 455/436; 455/550.1; 455/552.1; 455/553.1; 370/310.2; 370/328; 370/331

(58) Field of Classification Search
USPC .............. 455/41.2, 41.3, 552.1, 553.1, 550.1, 455/434, 436–444; 370/310.2, 328, 331
See application file for complete search history.

(56) References Cited

U.S. PATENT DOCUMENTS

| | | | | |
|---|---|---|---|---|
| 5,179,559 A | * | 1/1993 | Crisler et al. | 370/332 |
| 5,369,798 A | * | 11/1994 | Lee | 455/434 |
| 5,920,549 A | * | 7/1999 | Bruckert et al. | 370/331 |
| 5,946,633 A | * | 8/1999 | McAlinden | 455/551 |
| 6,205,190 B1 | * | 3/2001 | Antonio et al. | 375/346 |
| 6,288,678 B1 | * | 9/2001 | Giannetti | 343/700 MS |
| 6,381,471 B1 | * | 4/2002 | Dvorkin | 455/552.1 |
| 6,526,034 B1 | * | 2/2003 | Gorsuch | 370/338 |
| 7,260,416 B2 | * | 8/2007 | Shippee | 455/552.1 |
| 2003/0060222 A1 | * | 3/2003 | Rune | 455/517 |
| 2004/0157645 A1 | * | 8/2004 | Smith et al. | 455/562.1 |
| 2004/0203809 A1 | * | 10/2004 | Au et al. | 455/450 |
| 2004/0224719 A1 | * | 11/2004 | Nounin et al. | 455/553.1 |
| 2005/0070288 A1 | * | 3/2005 | Belkin et al. | 455/439 |
| 2005/0094589 A1 | * | 5/2005 | Camp, Jr. | 370/318 |
| 2005/0153736 A1 | * | 7/2005 | Ganton | 455/553.1 |
| 2005/0245269 A1 | | 11/2005 | Demirhan et al. | |

* cited by examiner

*Primary Examiner* — Steve D Agosta

(57) ABSTRACT

A wireless device comprises a plurality of receivers and logic coupled to the receivers. The logic causes at least one receiver to receive data communications from an access point while at least one other receiver concurrently scans for another access point.

9 Claims, 3 Drawing Sheets

WIRELESS DEVICE THAT RECEIVES DATA AND SCANS FOR ANOTHER ACCESS POINT

BACKGROUND

Wireless communication devices communicate with network nodes (e.g., access points). A structure such as a building may have multiple network nodes, some of which may be tuned to different carrier frequencies (i.e., channels). A wireless device "associates" with an access point, but, from time to time, may scan for another access point with which improved communication quality is possible (e.g., fewer dropped transmission packets, improved signal-to-noise ratio, etc.). While scanning for a better access point, the wireless device unfortunately does not receive data communications. Further, the scanning process is time-consuming.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
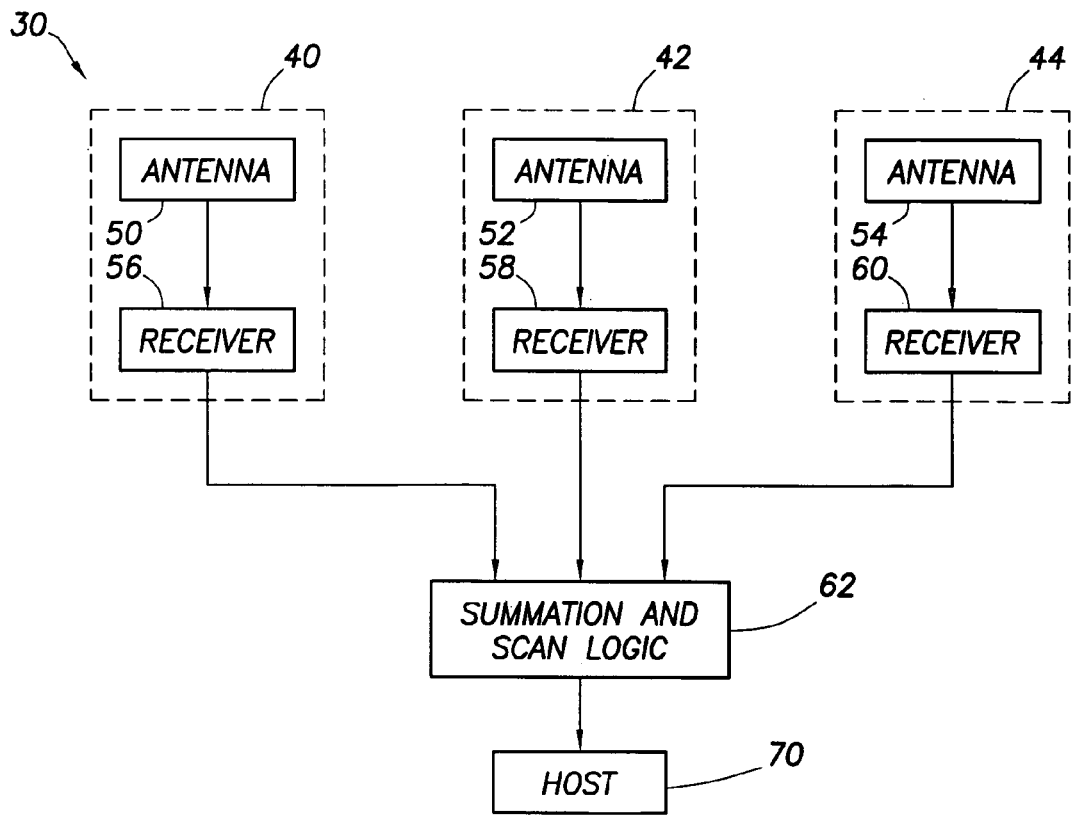
FIG. 1 shows a wireless device in accordance with embodiments of the invention.

FIG. 1 shows a wireless device 30 in accordance with embodiments of the invention. In some embodiments, wireless device 30 comprises a portable device such as laptop or hand-held computer, personal data assistant (PDA), etc., while in other embodiments is not portable. Device 30 comprises a plurality of receiver chains 40, 42, and 44 coupled to summation and scan logic 62. The summation and scan logic 62 also couples to host logic 70. In embodiments in which the device 30 comprises a computer, the host logic 70 comprises any one or more of a processor, memory, an input device (e.g., keyboard, mouse), an output device (e.g., display), etc.

Although three receiver chains 40-44 are shown in the example of FIG. 1, any number of receiver chains can be provided. Each receiver chain 40-44 comprises an antenna and a receiver. Each receive chain receives wireless communications from the access point (FIG. 2) with which the device 30 is currently associated. Receiver chain 40 comprises antenna 50 and receiver 56. Receiver chain 42 comprises antenna 52 and receiver 58, while receiver chain 44 comprises antenna 54 and receiver 60. The antennas 50-54 may be included within, or otherwise coupled to, the wireless device 30. In general, the antennas 50-54 are associated with the wireless device 30. Communications from the wireless device 30 to an access point may be transmitted through a transmitter coupled to one or more of the antennas.

The system 30 implements a multiple input/multiple output (MIMO) communication scheme in which data communications can be received concurrently by the system 30 via multiple receive chains 40-44. A data communication comprises any information received from an access point other than a "beacon." A beacon comprises a periodic signal transmitted by each access point that wireless devices use to determine with which access point to associate. The received signals from the receive chains are provided to the summation and scan logic 62 which combines the signals in a suitable manner to provide a signal representative of the multiple received signals to the host logic 70.

Figure 2:
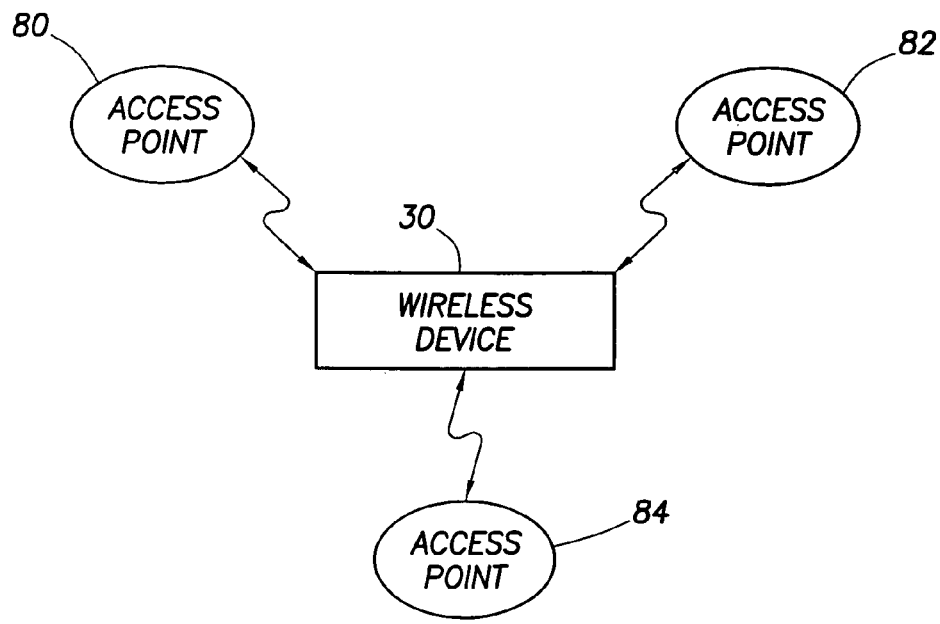
FIG. 2 illustrates a wireless network in which a wireless device can be used in accordance with embodiments of the invention.

FIG. 2 shows a wireless network comprising multiple access points 80, 82, and 84 to which the wireless device 30 can communicate. The wireless device 30 generally receives data communications from, and transmits data communications to, one of the access points 80-84. The wireless device 30 thus "associates" itself with one of the access points. As the wireless device 30 is moved relative to the access points 80-84 (in the embodiment in which wireless device 30 is portable), the wireless device 30 may become closer to another access point and associate with that access point to have higher quality communications (e.g., communications that have fewer errors). In general, the wireless device associates with the access point with which wireless communications are best, or at least better than the current access point.

The summation and scan logic 62 (FIG. 1) monitors the quality of the communications received from an associated access point and compares the quality level to a threshold to determine if the threshold has been violated. Examples of suitable thresholds comprise a rate of "dropped" packets, signal-to-noise ratio, etc. A dropped packet is a packet transmitted between an access point and a wireless device that is not correctly received and decoded and thus a retry request is issued to the packet sender to have the packet retransmitted. A threshold based on the rate of dropped packets is violated if the rate of dropped packets associated with the wireless device exceeds the threshold. A threshold based on the signal-to-noise ratio is violated if the signal-to-noise ratio associated with the wireless falls below the threshold. If the communication quality violates the threshold, the summation and scan logic 62 configures a receiver in at least one of the receive chains 40-44 to perform a scan for another access point. In accordance with embodiments of the invention, the summation and scan logic 62 thus configures at least one receiver to receive data communications from an access point while at least one other receiver concurrently scans for another access point. By scanning via at least one receive chain and continuing to receive data communications on at least one other receive chain, the device 30 need not completely cease receiving data communications while scanning. If a better access point is discovered (i.e., one which results in higher communication quality), the summation and scan logic 62 causes the device 30 to associate with the newly discovered access point.

In addition to, or instead of, a scan for an access point being triggered by the violation of a communication threshold, a scan may also be triggered by a software event. For example, the user of device 30 may interact in the device to cause a scan to occur. Further, scanning may occur in accordance with a predetermined schedule, such as once every n units of time (e.g., once every 10 minutes).

Figure 3:
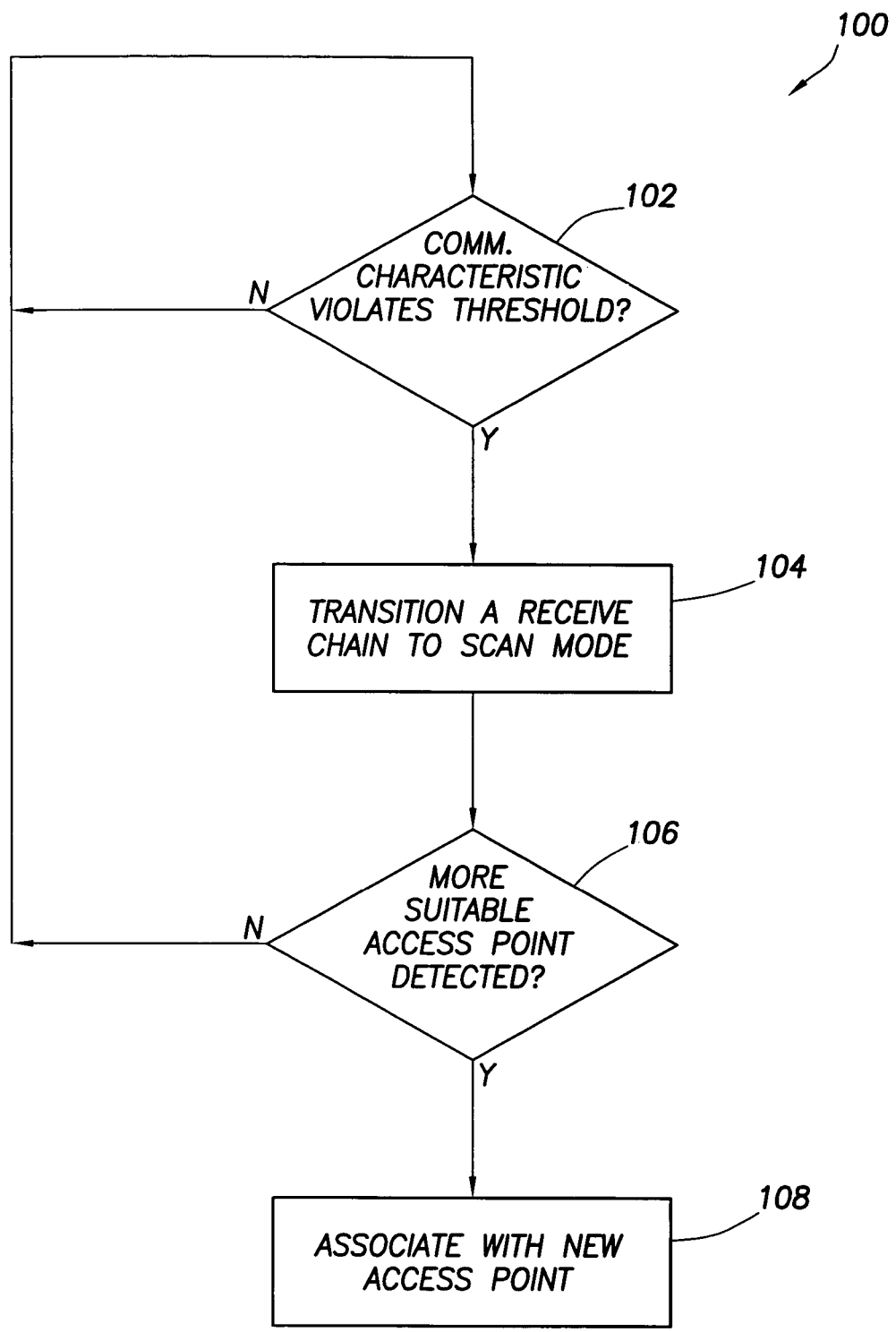
FIG. 3 shows a method in accordance with embodiments of the invention.

Referring to FIG. 3, a method 100 comprises one or more actions 102-108. At the beginning of method 100, one or more of the receiver chains 40-44 have been configured to receive data communications from an associated access point. The summation and scan logic 62 monitors the received data communications and compares a predetermined communication characteristic to a threshold. The predetermined characteristic comprises any one or more of such exemplary characteristics as the rate of dropped packets, signal-to-noise ratio, etc. The predetermined characteristic may be directly measured or computed. At decision 102, the summation and scan logic 62 determines if the predetermined communication characteristic violates a threshold. For example, the summation and scan logic 62 determines whether the rate of dropped packets exceed a related threshold or whether a signal-to-noise ratio falls below a related threshold.

If the predetermined characteristic violates a threshold, the summation and scan logic 62 causes a scan to occur to discover a new access point that provides for better communications, for example, communications whose communication characteristic does not violate the threshold. In accordance with embodiments of the invention, at least one of the receive chains 40-44 are configured by the summation and scan logic 62 to scan for another access point with which to the wireless device 30 should associate. Thus, while at least one receive chain 40-44 continues receiving data communications, at least one other receive chain 40-44 is used to scan for another access point. In embodiments in which only two receive chains are provided, one receive chain is thus used to receive data communications while the other receive chain is used to scan for another access point. In embodiments having three or more receive chains, at least one receive chain can be used to scan for an access point while at least one other receive chain concurrently receives data communications. If two or more receive chains are used to scan, then each receive chain can scan for a different predetermined set of communication channels while another receive chain is used to scan on another set of channels. The summation and scan logic 62 processes information from the scanning receive chains to determine with which, if any, access point the wireless device should now associate. Accordingly, all of the communication channels are scanned in less time than a single receive chain would have taken to scan all of the channels.

In accordance with various embodiments of the invention, each access point 80-84 transmits a beacon with a predetermined period. For example, an access point may transmit a beacon once every 100 milliseconds (ms). Accordingly, when scanning, a receive chain 40-44 tunes itself sequentially to each of the possible channels to which an access point may be tuned. The receive chain is tuned to each channel for a period of time that is greater than the beacon period. In an exemplary embodiment, if an access point transmits a beacon once every 100 ms, the receive chain in the wireless device 30 tunes itself to each channel for a duration of approximately 200 ms per channel to ensure sufficient time to receive a beacon.

In other embodiments, all receive chains can be used to scan for another access point. If the device 30 was already associated with an access point and was receiving data communications, data communications cease to be received by the wireless device during the scan, but scanning for a new access point is expedited as multiple receive chains 40-44 are used to concurrently seek out a new access point. If the device 30 was not currently associated with an access point (e.g., the device 30 was just initialized or was outside the coverage area of any access points), multiple (e.g., all) of the receive chains can be used to scan for an access point faster than if fewer (e.g., one) receive chains were used, for the scan.

Referring still to FIG. 3, if the summation and scan logic 62 discovers a more suitable access point (action 106), then at 108 the wireless device 30 discontinues its association with its current access point and establishes an association with the newly discovered access point.

Various embodiments discussed above disclose each receive chain comprising a receiver and an antenna in a MIMO configuration. Other embodiments of the wireless device 30 comprise the device 30 having a receive chain that receives data communications from an access point and having at least one other receive chain that, while not necessarily used to receive data communications, can be used to perform a scan. Thus, when a scan is performed, the receive chain used for data communications and at least one other non-data communication receive chain are used to perform the scan. In effect, such a wireless device comprises a dedicated scan receive chain.

Figure 4:
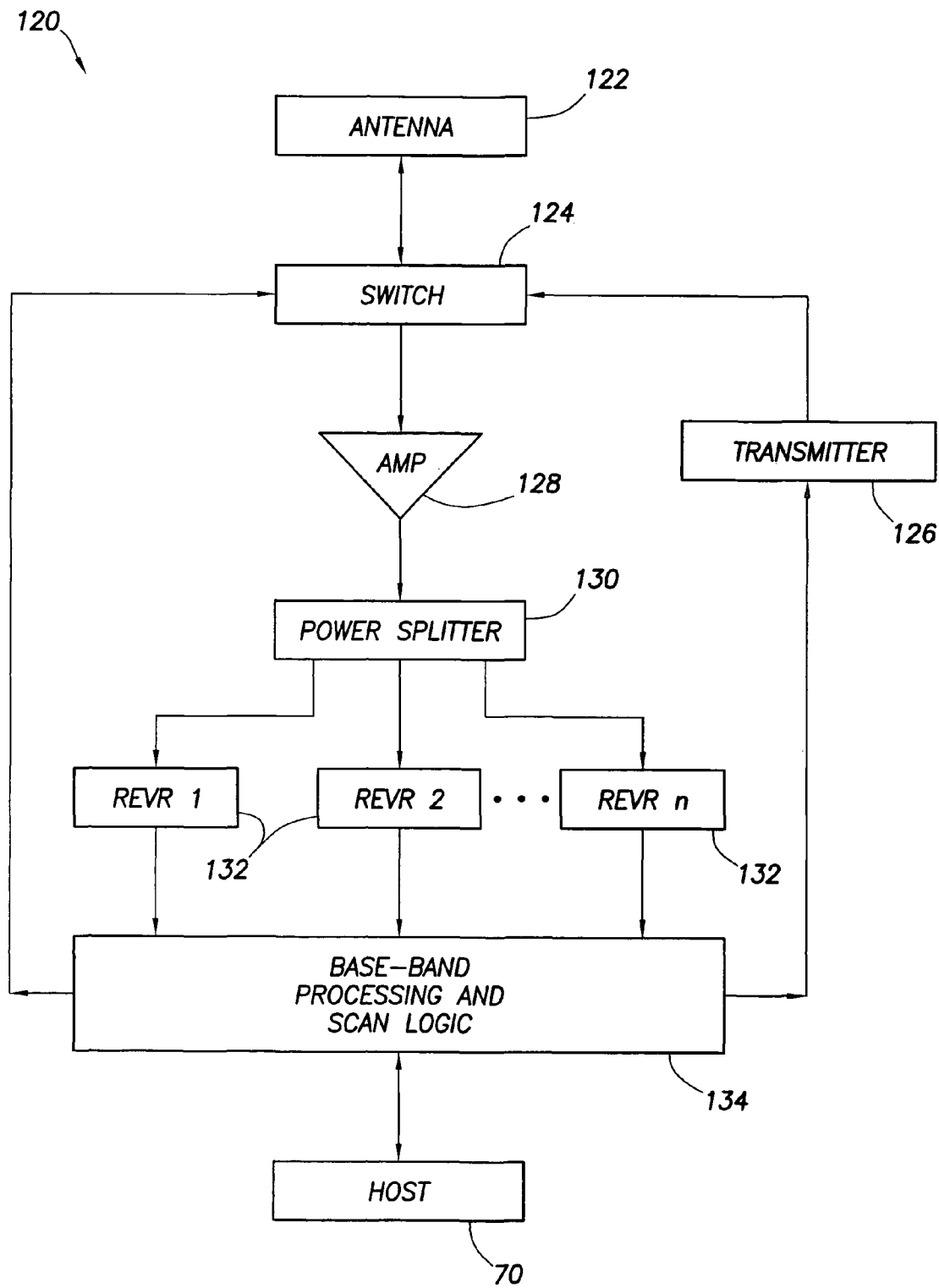
FIG. 4 shows an alternative embodiment of a wireless device.

FIG. 4 shows another embodiment of a wireless device 120. Device 120 comprise an antenna 122, a switch 124 (or duplexer), transmitter 126, an amplifier 128, a power splitter 130, a plurality of receivers 132 (RCVR1, RCVR2, ... RCVRn), base-band processing and scan logic 134 and host 70. Through the base-band processing and scan logic 134, the host 70 sends data to the transmitter 126 to be transmitted from the device 30 by the antenna 122. The switch 124 is controlled by the base-band processing and scan logic 134 to provide transmissions from the transmitter 126 to the antenna 122 or to provide in-coming transmissions from the antenna 122 to the amplifier 128. The amplifier 128 may be implemented as any suitable low-noise amplifier.

In the embodiment of FIG. 4, power splitter 130 receives amplified signals from the amplifier 128 and splits the signal among the various receivers 132. Each receiver 132 can be tuned to a different channel during a scan operation. Thus, in the embodiment of FIG. 4, multiple receivers 132 are used with a single antenna 122 to perform a scan. If desired, at least one receiver 132 can be allowed to continue receiving data communications while at least one other receiver is used in the scan operation. Although the embodiment of FIG. 4 shows one antenna 122 being used by multiple receivers 132, in other embodiments, multiple antennas can be used by multiple receivers 132, with one antenna per receiver or fewer antennas than receivers. When not performing an access point scan, one or more of the receivers 132 are used to receive data communications.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
  receiving a data communication from a first access point on a first receiver associated with a wireless device; and
  while receiving said data communication, using a second receiver associated with said wireless device to scan for another access point;
  wherein said first access point and said other access points are part of a common network;
  while using the second receiver to scan, using a third receiver associated with said wireless device to scan for another access point on channels that differ from channels on which the second receiver scans on the common network; and using the second receiver to receive a data communication instead of being used to scan for an access point.

2. The method of claim 1 further comprising, while using the second receiver to scan, using a third receiver associated with said wireless device to scan for another access point on said common network.

3. The method of claim 1 further comprising, while using the second receiver to scan, using a third receiver associated with said wireless device to scan for another access point on channels that differ from channels on which the second receiver scans on said common network.

4. The method of claim 1 further comprising associating the wireless device with another access point discovered during a scan.

5. The method of claim 1 further comprising using the second receiver to receive a data communication instead of being used to scan for an access point.

6. The method of claim 1 further comprising determining when a communication threshold is violated after which the second receiver is used to scan for another access point.

7. A method, comprising:
receiving a data communication from a first access point on a first receiver associated with a wireless device; and
while receiving said data communication, using a second receiver associated with said wireless device to scan for another access point;
wherein said first access point and said other access points are part of a common network;
further comprising: while using the second receiver to scan, using a third receiver associated with said wireless device to scan for another access point on channels that differ from channels on which the second receiver scans on the common network; and determining when a communication threshold is violated after which the second receiver is used to scan for another access point.

8. A wireless device, comprising: a plurality of receivers comprising at least first, second, and third receivers; and logic coupled to said receivers, said logic causes the first receiver to receive data communications from an access point on a network while the second receiver concurrently scans for another access point on the same network; wherein while the second receiver scans, the logic causes the third receiver to scan for another access point on channels that differ from channels on which the second receiver scans on the network; and wherein the second receiver subsequently receives a data communication instead of being used to scan for an access point.

9. A wireless device, comprising: a plurality of receivers comprising at least first, second, and third receivers; and logic coupled to said receivers, said logic causes the first receiver to receive data communications from an access point on a network while the second receiver concurrently scans for another access point on the same network, said logic causing said second receiver to scan upon determining that a communication threshold has been violated; wherein while the second receiver scans, the logic causes the third receiver to scan for another access point on channels that differ from channels on which the second receiver scans on the network.

* * * * *